(12) United States Patent
Elrod et al.

(10) Patent No.: US 6,280,312 B1
(45) Date of Patent: Aug. 28, 2001

(54) PELVIC BONE SPLITTER, PARTICULARLY FOR DEER

(76) Inventors: Geoff Elrod, HC 68 Box 741; Donald Kiesling, 1114 W. 12th, both of Brady, TX (US) 76825

( * ) Notice: Subject to any disclaimer, the term of this patent is extended or adjusted under 35 U.S.C. 154(b) by 0 days.

(21) Appl. No.: 09/538,146

(22) Filed: Mar. 29, 2000

(51) Int. Cl.7 .................................................. A22B 5/20
(52) U.S. Cl. .............................. 452/160; 30/173; 30/257
(58) Field of Search ............................ 452/160; 30/186, 30/188, 191, 173, 249, 257

(56) References Cited

U.S. PATENT DOCUMENTS

| | | | |
|---|---|---|---|
| 882,781 | * | 3/1908 | Gerpin . |
| 2,858,609 | * | 11/1958 | Hill . |
| 4,905,350 | * | 3/1990 | Gardner .................................. 30/120 |
| 4,964,216 | * | 10/1990 | Gosselin ................................. 30/254 |
| 5,108,343 | * | 4/1992 | Gilliam ..................................... 452/6 |
| 5,453,043 | | 9/1995 | Monson ................................ 452/160 |
| 5,690,548 | | 11/1997 | Jones et al. .......................... 452/160 |

* cited by examiner

*Primary Examiner*—Willis Little
(74) *Attorney, Agent, or Firm*—Bracewell & Patterson, L.L.P.

(57) ABSTRACT

A pelvic bone splitting tool provides a number of features to assist a hunter in field dressing game, such as deer. The tool or splitter may include a lower or grip handle formed as a unitary piece with an upper jaw. The grip handle includes finger-receiving indentations, and the upper jaw may include a cutting blade. The tool may further include an upper or palm handle formed as a unitary piece with a lower jaw, and the palm handle and the lower jaw may be joined together by an angled connecting piece, and the handles pivot relative to once another about a central pivot. The lower jaw includes a splitting blade, which may be removable from the tool. Alternatively, the upper handle/lower jaw combination and lower handle/upper jaw combination may be nearly mirror images of one another. These combinations are joined together at a rotating pivot which preferably forms a smoothly rotating bearing. The tool may include a saw blade articulated into the lower handle, and a combination knife blade and gut hook articulated into the upper handle. Further, the handle/jaw elements may themselves be articulated to provide a minimum form factor for ease of transporting the tool by a hunter.

15 Claims, 3 Drawing Sheets

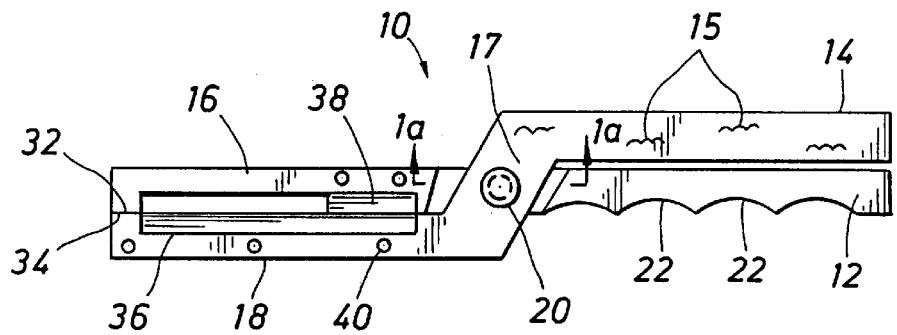
FIG.1
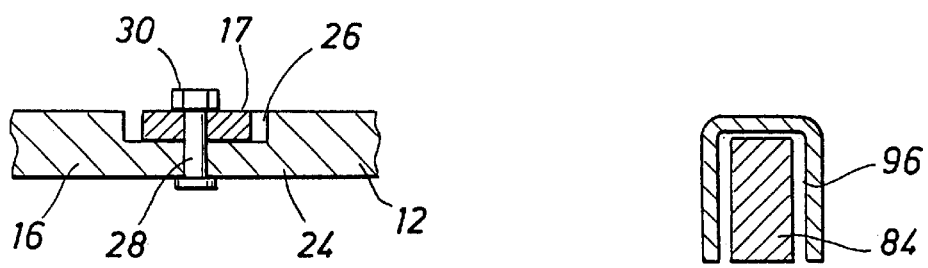
FIG.1a
FIG.2a
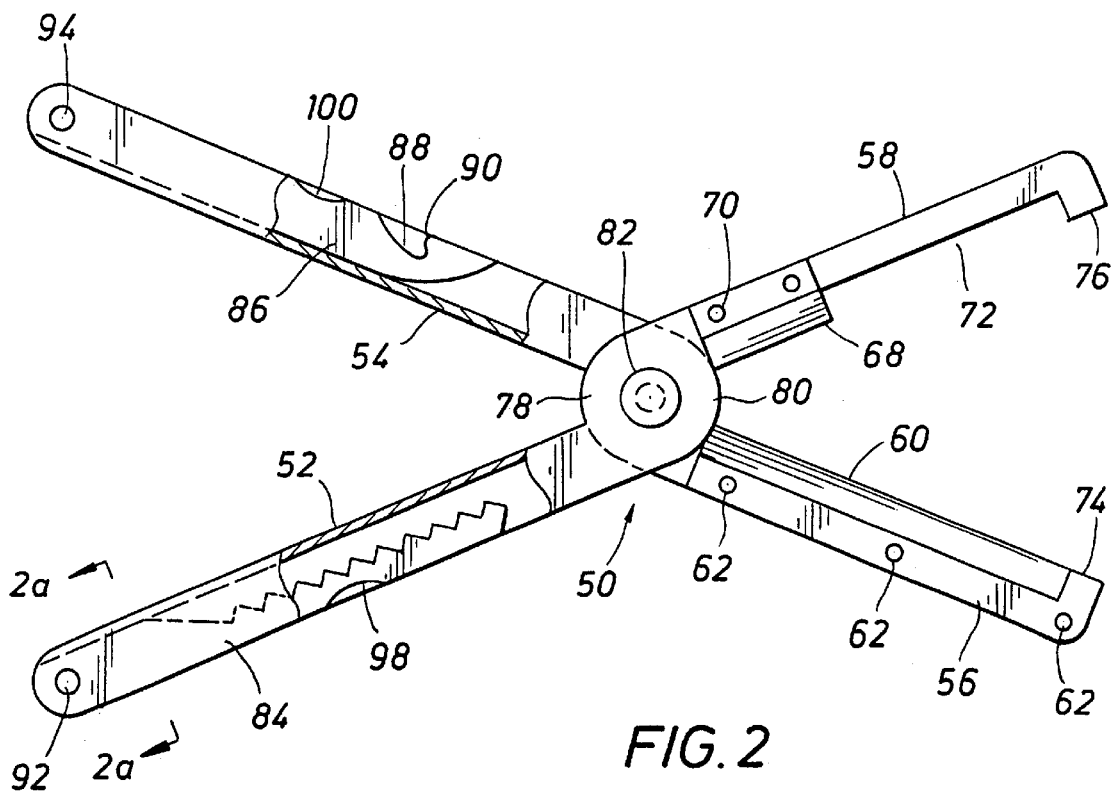
FIG.2

PELVIC BONE SPLITTER, PARTICULARLY FOR DEER

FIELD OF THE INVENTION

This invention relates to a pelvic bone splitter and its method of use. The pelvic bone splitter is primarily used to sever the pelvic bone of most game animals such as deer. Splitting the pelvic bone opens the body cavity of the animal to facilitate the removal of digestive and excretory organs.

BACKGROUND OF THE INVENTION

Hunters typically field-dress game animals near where the prey is felled. Failure to empty the body cavity of digestive and excretory organs promptly can cause the meat to have a strong, gamey taste or smell. However, hunters must take care not to cut or puncture any of those organs. Those organs contain contaminants such as urine, feces, or digestive fluids that can contaminate the meat.

Hunters often use hunting knives to field dress their game. While practical and convenient, hunting knives are generally ineffective for severing large bones. The obstacle presented by the pelvic bone often causes a hunter to unintentionally cut or puncture an organ, exposing the meat to contaminants.

Because splitting the pelvic bone reduces the risk of accidental contamination, hunters employ various tools and methods to split the pelvic bone. Some try to cleave the bone using an axe. Others use a rock to strike the back edge of a knife blade while holding the sharpened edge against the bone. Still others use saws. Each of those tools and methods has drawbacks.

Using a rock to strike a knife blade is both dangerous and difficult. Personal injury or inadvertent contamination may occur. An axe is cumbersome, heavy, and sharp. Its use could also lead to personal injury or inadvertent contamination. A saw is safer to use, but may still lead to inadvertent contamination. Using a saw is slow and requires substantial effort. It is also sharp and cumbersome to carry.

Pelvic bone splitting tools that rely on impact from an integral sliding weight are safer and more effective. Their main disadvantage, however, is the weight of the tool. To deliver a blow sufficient to sever a pelvic bone, the weight must be substantial. The substantial weight can be a burden for a hunter to bear.

Pelvic bone splitting tools that employ a shaft with a cutting blade hinged to an anvil shaft are also safe and effective. Their main disadvantage, however, is the length of the shafts needed to provide sufficient mechanical advantage makes the tool cumbersome to carry.

SUMMARY OF THE INVENTION

The present invention addresses these and other shortcomings in the art by providing a pelvic bone splitting tool which pivots about a center fulcrum. In a first embodiment, the tool or splitter includes a lower grip handle formed as a unitary piece with an upper jaw. The grip handle includes finger-receiving indentations, and the upper jaw may include a cutting blade. The tool further includes an upper or palm handle formed as a unitary piece with a lower jaw, and the palm handle and the lower jaw maybe joined together by an angled connecting piece. The lower jaw includes a splitting blade, which may be removable from the tool.

In another embodiment, the upper handle/lower jaw combination and lower handle/upper jaw combination may be nearly mirror images of one another. These combinations are joined together at a rotating pivot which preferably forms a smoothly rotating joint. The tool may include a saw blade articulated into one of the handles, and a combination knife blade and gut hook articulated into the other handle. Further, the handle/jaw elements may themselves be articulated to provide a minimum form factor for ease of transporting the tool by a hunter.

BRIEF DESCRIPTION OF DRAWINGS

FIG. 1 is a plan view of a preferred embodiment of the pelvic bone splitter with unitary handles and jaws closed.

FIG. 1a is a detail section view showing the joint between the unitary pieces which make up the splitter.

FIG. 2 is a plan view of another preferred embodiment of the splitter with the jaws open, again with unitary jaws and handles.

FIG. 2a is a cross sectional view through a handle of the invention.

DETAILED DESCRIPTION OF PREFERRED EMBODIMENTS

Figure 3:
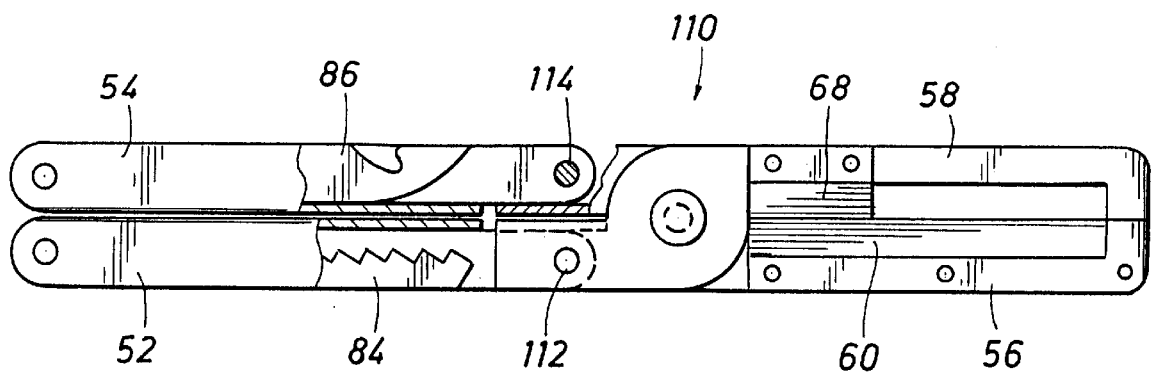
FIG. 3 is a plan view of another preferred embodiment of the splitter with articulated jaws and handles.
Figure 4:
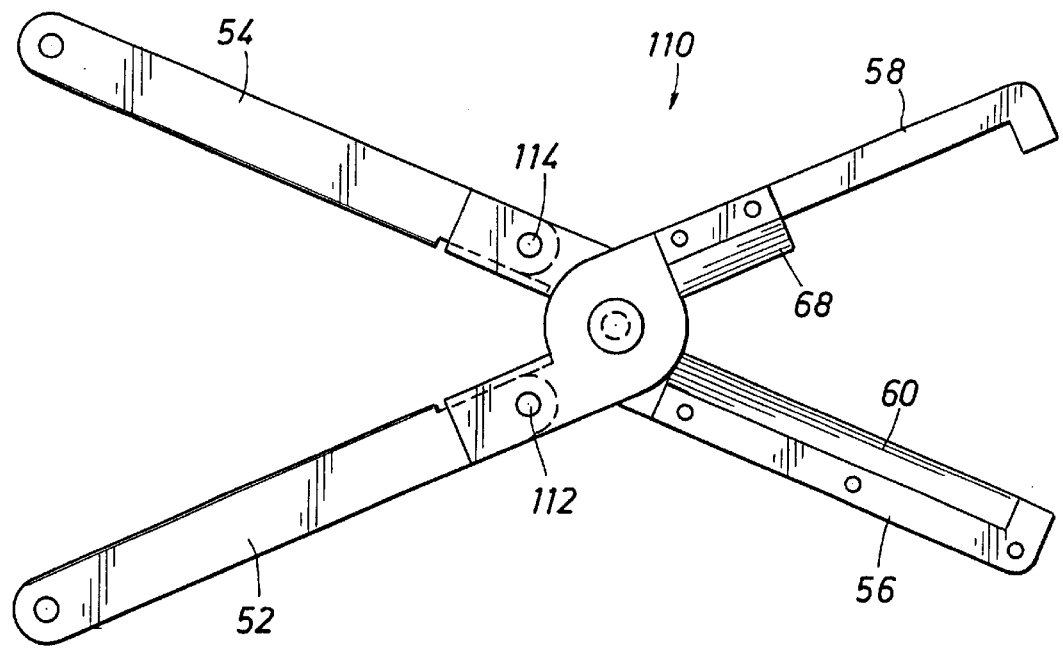
FIG. 4 is a plan view of the splitter of FIG. 3 with the handles and jaws open.

FIG. 1 shows a first preferred embodiment of a pelvic bone splitter 10 of the invention. The splitter 10 comprises a grip handle 12 and a palm handle 14. The palm handle 14 preferably includes knurls 15 to lessen slippage between the user's hand and the tool. Integrally formed with the grip handle 12 is an upper jaw 16 and integrally formed with the palm handle 14 is a lower jaw 18. The grip handle 12 and upper jaw 16 are formed as a unitary piece, such as for example by forging or by machining from a single workpiece. Similarly, the palm handle 14 and the lower jaw 18 are formed as a unitary piece. Joining the palm handle 14 and the lower jaw 18 is an angled cross piece 17. The handles are joined together at a pivot 20 for rotational movement, in a manner similar to conventional scissors.

In the embodiment of FIG. 1, the grip handle 12 includes a plurality of finger-receiving indentations 22 adapted to receive the user's fingers for comfort and ease of grip with the grip handle 12. The grip handle further includes a reduced thickness region 24 to receive the handle 14/lower jaw 18 unitary piece. This feature is show in more detail in FIG. 1a. The section view of FIG. 1a is taken along section lines 1a of FIG. 1. The angled cross piece 17 fits within a channel 26 formed by the reduced thickness region 24 between the handle 12 and the jaw 16. There is also a reduced thickness region and channel in the angled cross piece 17 between the handle 14 and the jaw 18 to mate with the region 24. The handles/jaw are joined together by a bolt 28 and nut 30 in a conventional manner.

Referring again to FIG. 1, the upper jaw 16 terminates in an upper abutting surface 32 which mates in abutting contact with a lower abutting surface 34 on the lower jaw 18. Running along the length of the lower jaw 18 is a splitting blade 36. Coupled into the upper jaw 16 is a shorter blade 38 which serves as a cutting blade. Both blades 36 and 38 are coupled to their respective jaws by screws 40 to permit the user to remove or replace one or both blades.

The entire tool is approximately 11½ inches long, so that the tool provides a great deal of leverage to grasp and break bone matter. Blade 38 may be used to cut through a small portion of the frontal pelvic bone, which is then split by the lower blade 36 by using a upward lever action.

Referring now to FIG. 2, another preferred embodiment of a pelvic bone splitter 50 is depicted. The splitter 50 includes a lower handle 52, an upper handle 54, an upper jaw 58, and a lower jaw 56. In this embodiment, the finger-receiving indentations 22 of FIG. 1 may also be included.

The upper and lower handles and jaws are very nearly mirror images of one another. In this case, however, as shown in FIG. 2, the lower jaw 56 supports a splitting blade 60, joined to the lower jaw 56 with a plurality of screws 62. Screws 62 may be removed to facilitate replacement of the splitting blade 60 for sharpening or replacement if it is dulled or damaged.

The upper jaw 58 is adapted to retain a cutting blade 68 by means of one or more screws 70. It should be noted, as also shown in FIG. 1, that the splitting blade 60 is relatively longer than the cutting blade 68, and that the splitting blade 60 may also be removable from the tool. This feature leaves a gap 72 in the upper jaw 58 which can accommodate bone matter without interfering with the closing action of the splitter 50.

The upper handle 54 and the lower jaw 56 are joined by a substantially circular section 78, and the lower handle 52 and upper jaw 58 are joined by a similar section 80, which in FIG. 2 is underneath the section 78. The sections 78 and 80 mate to form a smoothly pivoting bearing 82, which enhances the mechanical strength of the tool, particularly while splitting relatively heavy bone matter.

The tool of FIG. 2 differs from that of FIG. 1 in another aspect in the inclusion of an articulated tool 84 in the lower handle 52 and an articulated tool 86 in the upper handle 54. The tool 84 is preferably a saw blade, and the tool 86 is preferably a combination knife blade and gut hook. The tool 86 includes a notch 88 which defines a cutting surface 90 to cleanly and smoothly rip the skin of the game animal. The articulated tool 86 is joined to the upper handle 54 by a hinge pin 94. Each of the articulated tools 84 and 86 fits into a channel, such as a channel 96, shown in FIG. 2a, for the tool 84. Also, the articulated tool 84 includes a notch 98 to receive a fingernail or thumbnail of a user, and the articulated tool 86 includes a similar notch 100.

To this point, the upper handle/lower jaw combination and the lower handle/upper jaw combination have each been of unitary construction. This results in a very effective pelvic bone splitter which carries out the functions for which the tool was invented. It results in a tool which is about 11½" long when the handles are open. FIGS. 3 through 6 depict still another feature of the invention in which the jaw and handles are also articulated to reduce the size of the tool in the collapsed condition even further.

Figure 5:
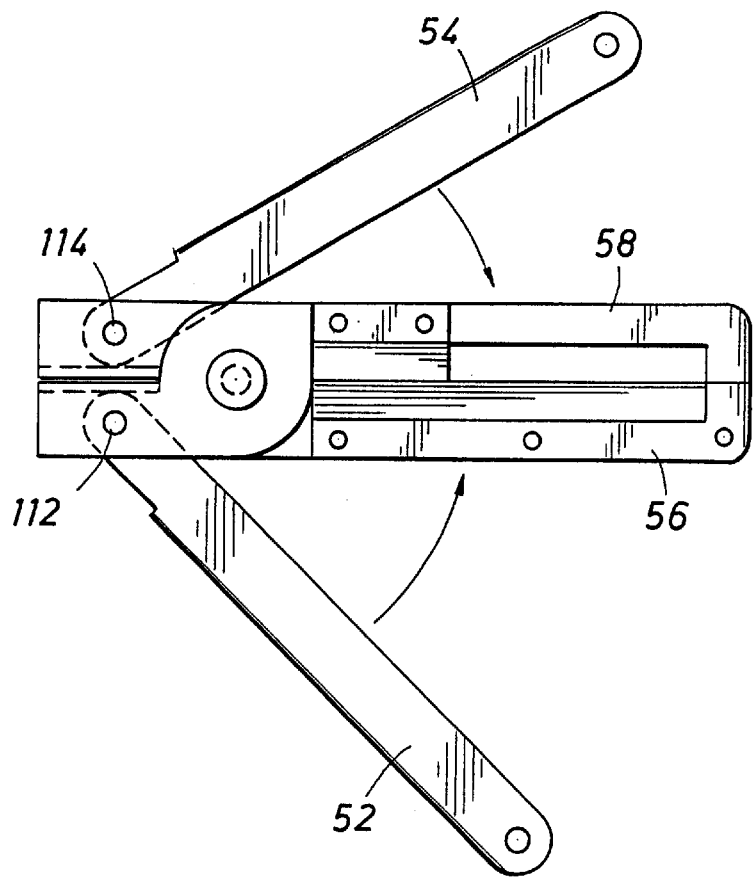
FIG. 5 is plan view of the splitter of FIGS. 3 and 4, with the handles of the splitter partially retracted.
Figure 6:
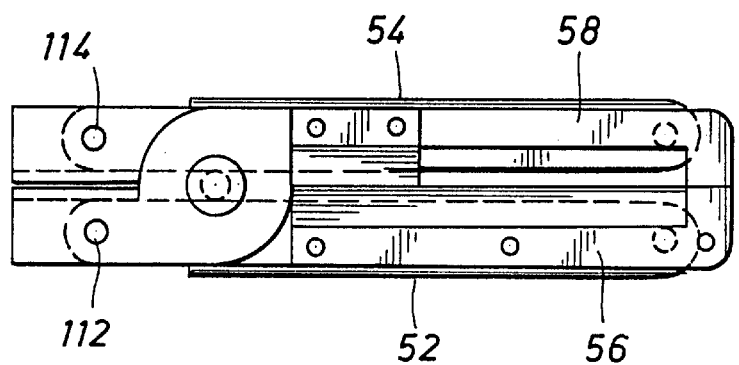
FIG. 6 is a plan view of the splitter of FIGS. 3 through 5 with the handles fully retracted.

In this preferred embodiment, a splitter 110 includes the upper handle 54 and the upper jaw 56. They are joined together by a pivoting joint and by a hinge pin 114. The joint is preferably spring loaded like a conventional pocket knife. Similarly, the lower handle 52 and the upper jaw 58 are joined at a pivoting joint by a hinge pin 112, which is also spring loaded. The embodiment depicted in FIGS. 3 and 4 operate in a manner that is identical to that described in respect of FIG. 2. However, as shown in FIGS. 5 and 6, the upper handle 54 rotates about the hinge pin 114, and the lower handle 52 rotates about the hinge pin 112, shown in a partially collapsed condition in FIG. 5, and a completely collapsed condition in FIG. 6. The completely collapsed condition results in a tool of the same width, but of about 6" in length.

The principles, preferred embodiments and modes of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention, which is defined by the accompanying claims.

We claim:

1. A pelvic bone splitter comprising:
    a lower handle joined to an upper jaw;
    an upper handle joined to a lower jaw;
    a pivot joining the lower handle and upper handle for rotation about the pivot;
    a cutting blade in the upper jaw; and
    a channel in the upper handle adapted to receive an articulated tool joined to the upper handle by a hinge pin, wherein the articulated tool is a combination knife blade and gut hook.

2. The splitter of claim 1, further comprising an angled element joining the upper handle and the lower jaw, and wherein the pivot is located in the angled element.

3. The splitter of claim 1, further comprising finger-receiving indentations in the lower handle.

4. The splitter of claim 1, wherein the cutting blade does not extend the length of the upper jaw.

5. The splitter of claim 1, further comprising a splitting blade extending the length of the lower jaw.

6. The splitter of claim 1, further comprising an upper abutting surface on the upper jaw and a lower abutting surface on the lower jaw, wherein the upper and lower abutting surfaces are adapted for abutting contact with one another.

7. The splitter of claim 6, further comprising a splitting blade extending the length of the lower jaw and a gap between the splitting blade and the upper abutting surface.

8. The splitter of claim 1, further comprising a channel in the lower handle adapted to receive an articulated tool joined to the lower handle by a hinge pin.

9. The splitter of claim 8, wherein the articulated tool is a saw blade.

10. The splitter of claim 1, further comprising:
    a. a first pivoting joint between the lower handle and the upper jaw; and
    b. a second pivoting joint between the upper handle and the lower jaw.

11. The splitter of claim 1, wherein the cutting blade is removable from the upper jaw.

12. The splitter of claim 5, wherein the splitting blade is removable from the lower jaw.

13. A pelvic bone splitter comprising:
    a lower handle pivotably joined to an upper jaw;
    an upper handle pivotably joined to a lower jaw;
    a flat surface joining the lower handle and upper handle for rotation about a hinge;
    a splitting blade in the lower jaw;
    a cutting blade in the upper jaw, wherein the splitting blade is longer than the cutting blade; and
    a channel in the upper handle adapted to receive an articulated tool joined to the upper handle by a hinge pin, wherein the articulated tool is a combination knife blade and gut hook.

14. The splitter of claim 13, further comprising an upper abutting surface on the upper jaw and a lower abutting surface on the lower jaw, wherein the upper and lower abutting surfaces are adapted for abutting contact with one another.

15. A pelvic bone splitter comprising:

a lower handle joined to an upper jaw;

an upper handle joined to a lower jaw;

a pivot joining the lower handle and upper handle for rotation about the pivot;

a cutting blade in the upper jaw; and a channel in the lower handle adapted to receive an articulated tool joined to the lower handle by a hinge pin, wherein the articulated tool is a saw blade.

* * * * *